T. WADE, L. ERICKSON & F. PUSCH.
IMPLEMENT TRUCK AND GAGE WHEEL.
APPLICATION FILED AUG. 5, 1908.
911,788.  Patented Feb. 9, 1909.
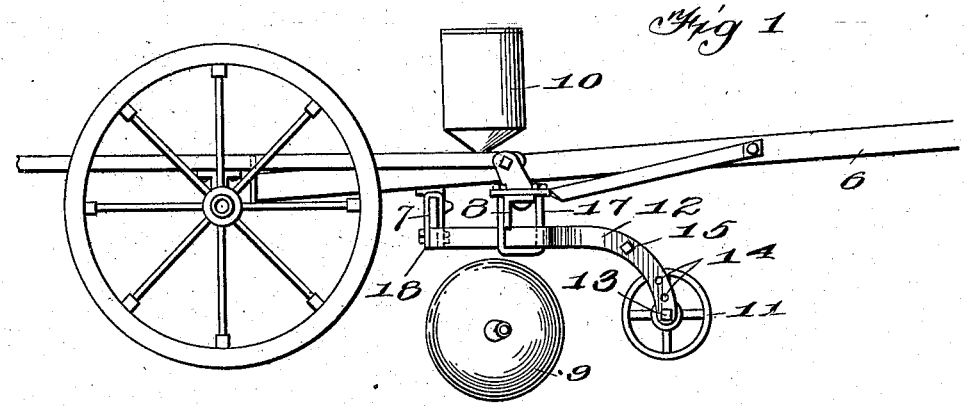
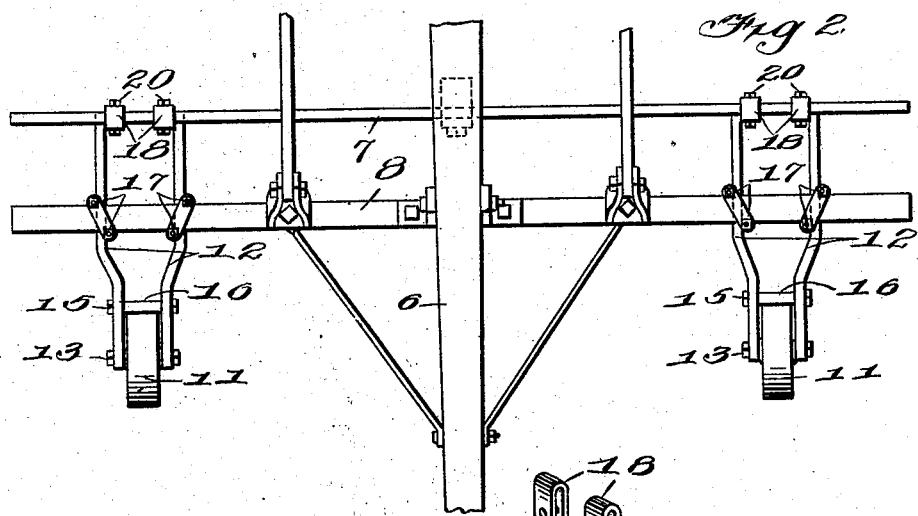
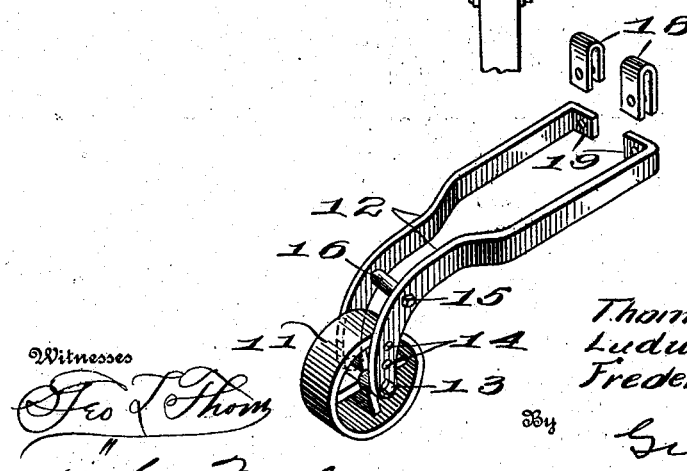

UNITED STATES PATENT OFFICE.

THOMAS WADE, LUDWIG ERICKSON, AND FREDERICK PUSCH, OF FOUNTAIN, MINNESOTA.

IMPLEMENT TRUCK AND GAGE WHEEL.

No. 911,788.  Specification of Letters Patent.  Patented Feb. 9, 1909.

Application filed August 5, 1908. Serial No. 447,113.

*To all whom it may concern:*

Be it known that we, THOMAS WADE, LUDWIG ERICKSON, and FREDERICK PUSCH, citizens of the United States, residing at Fountain, in the county of Fillmore and State of Minnesota, have invented certain new and useful Improvements in Implement Truck and Gage Wheels, of which the following is a specification.

This invention relates to trucks for agricultural implements and the like, and has for its object to provide an improved truck or device which is particularly adapted for use in connection with corn planters and which will act to take the weight of the planter off the end of the tongue and the necks of the horses and also act as a gage wheel or runner to cause the shoes or disks of the planter to follow the surface of the ground and plant at equal depths on uneven surfaces. The devices will thus serve the double function of a support for the front end of the implement and as a gage to regulate the planter. The wheel forming a part of the device may be raised and lowered to adjust the planter to the desired depth.

The invention is illustrated in the accompanying drawings, in which—

Figure 1 is a side elevation showing the device applied to a corn planter of known construction; Fig. 2 is a top plan view of the front part of the planter; Fig. 3 is a perspective view of one of the devices detached.

The invention is shown and illustrated in connection with a known corn planter having a tongue 6 and two front cross bars 7 and 8 which by means which need not be described here carry the planting disks 9 which open the furrow for the seed fed from the seed box 10. The planter shown is a double planter, having bars and planting disks on each side of the tongue. Therefore a pair of the devices invented by us has been shown, one of the devices being associated with each set of the planting disks. Each of the devices so invented by us consists of a ground wheel 11 carried by a bracket consisting of a pair of bent arms 12. The wheel is carried at the front end of the bracket, between the front ends of the arms, upon an axle 13, which is adjustable in a series of holes 14 whereby the wheel may be raised or lowered as desired.

The arms 12 are connected by a bolt 15 and spaced apart by a sleeve 16 on said bolt. The rear ends of the arms are fastened to the under side of the bars 7 and 8 of the planter. The arms are fastened to the front bar 7 by U-bolts or clips 17 and they are fastened to the rear bar 8 by means of straps 18. These straps extend around the bar 8 and are fastened at their lower ends to offsets 19 formed at the rear ends of the arms 12, by means of bolts 20 which extend through the straps and through said offsets. This method of attachment serves to prevent any slip backwards of the arms. The arms are made of suitable metal shapes to give the requisite strength and rigidity, and as shown are fastened to the planter bars at opposite sides of the disks or planting devices. The front ends of the arms are bent down, and accordingly the wheel 11 is located directly in front of the planter disks and runs along the ground in front of the same. Consequently the wheel will follow the surface of the ground and will raise or lower the planter disks accordingly, whereby the seed is planted at an equal depth, and rough ground will not have the effect of causing the planting to be done irregularly, as would otherwise be the case. The devices act as trucks to support the front parts and tongue of the planter, and so make it much easier on the horses. The arms are shown bowed out at the back to extend around the planting apparatus leading to the disks, but in this respect, as well as in other respects, no limitation is implied by reason of the particular structure shown, since various modifications may be made within the scope of the invention.

The attachment adds but little weight to the vehicle and by relieving the load from the necks of the horses, makes the draft easier.

Although shown in connection with a particular kind of planter, the invention may be applied to other planters, or other kinds of agricultural implements, with little or no modification.

I claim:

1. The combination with a planter having front and rear bars extending laterally from the tongue, and furrow devices carried by said bars, of arms projecting forwardly from said bars, and clamped at their rear ends to the rear bar and clamped intermediately to the front bar, and ground wheels carried at the front ends of said arms.

2. The combination with a planter having front and rear bars, of an attachment of the kind described, comprising a pair of arms each having an offset at the rear end and a fastening device between said offset and the rear bar, a wheel mounted between the front ends of the arms, and clamps connecting the arms and the front bar.

In testimony whereof, we affix our signatures in presence of two witnesses.

THOMAS WADE.
LUDWIG ERICKSON.
FREDERICK PUSCH.

Witnesses:
L. M. LARSON.
COLLIE FOSS.